(12) United States Patent
Xu et al.

(10) Patent No.: US 8,649,566 B2
(45) Date of Patent: Feb. 11, 2014

(54) MOTION QUALITY ERROR DETECTION IN PRINTING SYSTEMS USING DOCUMENTS HAVING TEXT OR LINE CONTENT

(75) Inventors: Beilei Xu, Penfield, NY (US); Wencheng Wu, Webster, NY (US); Peter Paul, Webster, NY (US); Palghat Ramesh, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 249 days.

(21) Appl. No.: 12/838,942

(22) Filed: Jul. 19, 2010

(65) Prior Publication Data

US 2012/0014566 A1 Jan. 19, 2012

(51) Int. Cl.
*G06K 9/00* (2006.01)
*G06K 9/03* (2006.01)
*G06K 9/20* (2006.01)

(52) U.S. Cl.
USPC ............ 382/112; 382/140; 382/310; 382/317

(58) Field of Classification Search
None
See application file for complete search history.

(56) References Cited

U.S. PATENT DOCUMENTS

| | | | |
|---|---|---|---|
| 5,187,753 A | | 2/1993 | Bloomberg et al. |
| 5,732,306 A | * | 3/1998 | Wilczak, Jr. ...................... 399/9 |
| 2005/0238205 A1 | * | 10/2005 | Kimura et al. ................ 382/112 |
| 2007/0236747 A1 | * | 10/2007 | Paul ............................. 358/3.26 |
| 2008/0013848 A1 | * | 1/2008 | Wu et al. ....................... 382/254 |
| 2009/0002724 A1 | * | 1/2009 | Paul et al. ...................... 358/1.1 |
| 2009/0015888 A1 | * | 1/2009 | Chen et al. .................... 358/522 |
| 2009/0087020 A1 | * | 4/2009 | Yamaguchi et al. .......... 382/100 |
| 2009/0097750 A1 | * | 4/2009 | Tamaru ........................ 382/176 |

\* cited by examiner

*Primary Examiner* — Amir Alavi
*Assistant Examiner* — Kenny Cese
(74) *Attorney, Agent, or Firm* — Pillsbury Winthrop Shaw Pittman, LLP

(57) ABSTRACT

A method for detecting motion quality error of printed documents having text in a printing system includes: printing a document having text lines, each text line comprising a plurality of characters; scanning the printed document to generate a scanned image; detecting positions in a process direction of the printing system of one of text lines and characters in the scanned image; determining position errors in the process direction in the printed document based on the detected positions in the scanned image; determining at least one motion quality defect of the printing system in the process direction based on the determined position errors; and initiating an activity associated with said printing system in response to a motion quality error having been determined. A system for detecting motion quality error of printed documents is also disclosed.

32 Claims, 12 Drawing Sheets

$p_j$ for the membership probability, that is, the probability for an observation to come from $\pi_j$. The maximum likelihood rule then classifies an observation $\mathbf{x}$ into $\pi_k$ if $\ln(p_k f_k(\mathbf{x}))$ is the maximum of the set $\{\ln(p_j f_j(\mathbf{x})); j = 1, \ldots, l\}$. If we assume that the density $f_j$ for each group is Gaussian with mean $\mu_j$ and covariance matrix $\Sigma_j$, then it can be seen that the maximum likelihood rule is equivalent to maximizing the discriminant scores $d_j^Q(\mathbf{x})$ with $$(22) \quad \begin{cases} d_j^Q(\mathbf{x}) = -\tfrac{1}{2}\ln|\Sigma_j| \\ \quad -\tfrac{1}{2}(\mathbf{x}-\mu_j)'\Sigma_j^{-1}(\mathbf{x}-\mu_j) \\ \quad +\ln(p_j). \end{cases}$$

That is, $\mathbf{x}$ is allocated to $\pi_k$ if $d_k^Q(\mathbf{x}) > d_j^Q(\mathbf{x})$ for all $j = 1, \ldots, l$ (see, e.g., Johnson and Wichern, 1998).

In practice $\mu_j$, $\Sigma_j$ and $p_j$ have to be estimated. Classical quadratic discriminant analysis (CQDA) uses the group's mean and empirical covariance matrix to estimate $\mu_j$ and $\Sigma_j$. The membership probabilities are usually estimated by the relative frequencies of the observations in each group, hence $\hat{p}_j = n_j/n$ with $n_j$ the number of observations in group $j$.

A robust quadratic discriminant analysis (RQDA) is derived by using robust estimators of $\mu_j$, $\Sigma_j$ and $p_j$. In particular, we can apply the weighted MCD estimator of location and scatter in each group. As a byproduct of this robust procedure, outliers (within each group) can be distinguished from the regular observations. Finally, the membership probabilities can be robustly estimated as the relative frequency of *regular* observations in each group. For an outline of this approach, see Hubert and Van Driessen (2004).

When the groups are assumed to have a common covariance matrix $\Sigma$, the quadratic scores (22) can be simplified to $$(23) \quad d_j^L(\mathbf{x}) = \mu_j'\Sigma^{-1}\mathbf{x} - \tfrac{1}{2}\mu_j'\Sigma^{-1}\mu_j + \ln(p_j)$$

since the terms $-\tfrac{1}{2}\ln|\Sigma|$ and $-\tfrac{1}{2}\mathbf{x}'\Sigma^{-1}\mathbf{x}$ do not depend on $j$. The resulting scores (23) are linear in $\mathbf{x}$, hence the maximum likelihood rule belongs to the class of *linear discriminant analysis*. It is well known that if we have only two populations ($l = 2$) with a common covariance structure and if both groups have equal membership probabilities, this rule coincides with Fisher's linear discriminant rule. Robust linear discriminant analysis based on the MCD estimator or S-estimators has been studied in Hawkins and McLachlan (1997), He and Fung (2000), Croux and Dehon (2001) and Hubert and Van Driessen (2004). The latter paper computes $\hat{\mu}_j$ and $\hat{\Sigma}_j$ by weighted MCD and then defines the pooled covariance matrix $\hat{\Sigma} = (\sum_{j=1}^l n_j \hat{\Sigma}_j)/n$.

We consider a dataset that contains the spectra of three different cultivars of the same fruit (cantaloupe—Cucumis melo L. Cantaloupensis). The cultivars (named D, M and HA) have sizes 490, 106 and 500, and all spectra were measured in 256 wavelengths. The dataset thus contains 1096 observations and 256 variables. First, a robust principal component analysis (as described in the next section) was applied to reduce the dimension of the data space, and the first two components were retained. For a more detailed description and analysis of these data, see Hubert and Van Driessen (2004).

The data were divided randomly in a training set and a validation set, containing 60% and 40% of the observations. Figure 9 shows the training data. In this figure cultivar D is marked with crosses, cultivar M with circles and cultivar HA with diamonds. We see that cultivar HA has a cluster of outliers that are far away from the other observations. As it turns out, these outliers were caused by a change in the illumination system. To classify the data, we will use model (23) with a common covariance matrix $\Sigma$. Figure 9(a) shows the classical tolerance ellipses for the groups, given by $(\mathbf{x} - \hat{\mu}_j)'\hat{\Sigma}^{-1}(\mathbf{x} - \hat{\mu}_j) = \chi^2_{2,0.975}$. Note how strongly the classical covariance estimator of the common $\Sigma$ is influenced by the outlying subgroup of cultivar HA. On the other hand, Figure 9(b) shows the same data with the corresponding robust tolerance ellipses.

The effect on the resulting classical linear discriminant rules is dramatic for cultivar M. It appears that all the observations are badly classified because they would have to belong to a region that lies completely outside the boundary of this figure! The robust discriminant analysis does a better job. The tolerance ellipses are not affected by the outliers and the resulting discriminant lines split up the different groups more accurately. The misclassification rates are 17% for cultivar D, 95% for cultivar M and 6% for cultivar HA. The misclassification rate of cultivar M remains very high. This is due to the intrinsic overlap between the three groups, and the fact that cultivar M has few data points compared to the others. (When we impose that all three groups are equally important by setting the membership probabilities equal to 1/3, we obtain a better classification of cultivar M with 46% of errors.)

This example thus clearly shows that outliers can have a huge effect on the classical discriminant rules, whereas the robust version fares better.

FIG. 3

510 x into $\pi_k$ if $\ln(p_k f_k(\mathbf{x}))$ is the maximum of the set $\{\ln(p_j f_j(\mathbf{x})); j = 1, \ldots, l\}$. If we assume that the density $f_j$ for each group is Gaussian with mean $\mu_j$ and covariance matrix $\Sigma_j$, then it can be seen that the maximum likelihood rule is equivalent to maximizing the discriminant scores $d_j^Q(\mathbf{x})$ with

(22)
$$d_j^Q(\mathbf{x}) = -\tfrac{1}{2}\ln|\Sigma_j| \\ -\tfrac{1}{2}(\mathbf{x} - \mu_j)'\Sigma_j^{-1}(\mathbf{x} - \mu_j) \\ + \ln(p_j).$$

That is, $\mathbf{x}$ is allocated to $\pi_k$ if $d_k^Q(\mathbf{x}) > d_j^Q(\mathbf{x})$ for all $j = 1, \ldots, l$ (see, e.g., Johnson and Wichern, 1998).

In practice $\mu_j$, $\Sigma_j$ and $p_j$ have to be estimated. Classical quadratic discriminant analysis (CQDA) uses the group's mean and empirical covariance matrix to estimate $\mu_j$ and $\Sigma_j$. The membership probabilities are usually estimated by the relative frequencies of the observations in each group, hence $\hat{p}_j = n_j/n$ with $n_j$ the number of observations in group $j$.

A robust quadratic discriminant analysis (RQDA) is derived by using robust estimators of $\mu_j$, $\Sigma_j$ and $p_j$. In particular, we can apply the weighted MCD estimator of location and scatter in each group. As a byproduct of this robust procedure, outliers (within each group) can be distinguished from the regular observations. Finally, the membership probabilities can be robustly estimated as the relative frequency of *regular* observations in each group. For an outline of this approach, see Hubert and Van Driessen (2004).

When the groups are assumed to have a common covariance matrix $\Sigma$, the quadratic scores (22) can be simplified to

(23) $d_j^L(\mathbf{x}) = \mu_j' \Sigma^{-1} \mathbf{x} - \tfrac{1}{2}\mu_j' \Sigma^{-1} \mu_j + \ln(p_j)$ since the terms $-\tfrac{1}{2}\ln|\Sigma|$ and $-\tfrac{1}{2}\mathbf{x}'\Sigma^{-1}\mathbf{x}$ do not depend on $j$. The resulting scores (23) are linear in $\mathbf{x}$, hence the maximum likelihood rule belongs to the class of *linear discriminant analysis*. It is well known that if we have only two populations ($l = 2$) with a common covariance structure and if both groups have equal membership probabilities, this rule coincides with Fisher's linear discriminant rule. Robust linear discriminant analysis based on the MCD estimator or S-estimators has been studied in Hawkins and McLachlan (1997), He and Fung (2000), Croux and Dehon (2001) and Hubert

520 three different cultivars of the same fruit (cantaloupe—Cucumis melo L. Cantaloupensis). The cultivars (named D, M and HA) have sizes 490, 106 and 500, and all spectra were measured in 256 wavelengths. The dataset thus contains 1096 observations and 256 variables. First, a robust principal component analysis (as described in the next section) was applied to reduce the dimension of the data space, and the first two components were retained. For a more detailed description and analysis of these data, see Hubert and Van Driessen (2004).

512

The data were divided randomly in a training set and a validation set, containing 60% and 40% of the observations. Figure 9 shows the training data. In this figure cultivar D is marked with crosses, cultivar M with circles and cultivar HA with diamonds. We see that cultivar HA has a cluster of outliers that are far away from the other observations. As it turns out, these outliers were caused by a change in the illumination system. To classify the data, we will use model (23) with a common covariance matrix $\Sigma$. Figure 9(a) shows the classical tolerance ellipses for the groups, given by 515 $(x - \hat{\mu}_j)' \hat{\Sigma}^{-1} (x - \hat{\mu}_j) = \chi^2_{2,0.975}$. Note how strongly the classical covariance estimator of the common $\Sigma$ is influenced by the outlying subgroup of cultivar HA. On the other hand, Figure 9(b) shows the same data with the corresponding robust tolerance ellipses.

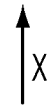

The effect on the resulting classical linear discriminant rules is dramatic for cultivar M. It appears that all the observations are badly classified because they would have to belong to a region that lies completely outside the boundary of this figure! The robust discriminant analysis does a better job. The tolerance ellipses are not affected by the outliers and the resulting discriminant lines split up the different groups more accurately. The misclassification rates are 17% for cultivar D, 95% for cultivar M and 6% for cultivar HA. The misclassification rate of cultivar M remains very high. This is due to the intrinsic overlap between the three groups, and the fact that cultivar M has few data points compared to the others. (When we impose that all three groups are equally important by setting the membership probabilities equal to 1/3, we obtain a better classification of cultivar M with 46% of errors.)

This example thus clearly shows that outliers can have a huge effect on the classical discriminant rules,

FIG. 5B

MOTION QUALITY ERROR DETECTION IN PRINTING SYSTEMS USING DOCUMENTS HAVING TEXT OR LINE CONTENT

FIELD

This application generally relates to printing, and in particular, motion quality error detection in print systems using documents having text content.

BACKGROUND

Motion quality is a contributor to image quality (IQ) problems in printers and copiers and may occur as the printing system degrades due to ordinary wear-and-tear, contamination and/or a failure in one of its parts. Motion quality errors may occur due to uncontrolled speed or velocity changes of parts in the printer, such as intermediate belts and photoreceptor surfaces. Examples of motion quality errors seen on output prints include distorted images in the process direction, improper alignment of content in the process direction, offset lines of text, improper line spacing, improper character spacing, etc.

It is known to detect IQ defects before they become a problem by monitoring the motion quality of a marking engine. For example, test targets, such as "ladder charts," have been used, and are very accurate for this purpose. However, printing test-targets interrupts regular print jobs and wastes valuable resources.

Methods are also known which detect bands and streaks using printed documents themselves. These methods rely primarily on pictorial and/or color portions of the images to determine many uniformity-based IQ defects such as, for example, bands, streaks, mottle and graininess.

However, portions of the printed images that contain text features are generally not considered for further analysis because they are not believed to provide much useful information for IQ analysis.

SUMMARY

In one embodiment, a method for detecting motion quality error of printed documents in a printing system comprises: printing a document having text lines, each text line comprising a plurality of characters; scanning the printed document to generate a scanned image; detecting positions in a process direction of the printing system of one of text lines and characters in the scanned image; determining position errors in the process direction in the printed document based on the detected positions in the scanned image; determining at least one motion quality defect of the printing system in the process direction based on the determined position errors; and initiating an activity associated with said printing system in response to a motion quality error having been determined.

In one embodiment, a printing system for detecting motion quality error of printed documents comprises: a print engine configured to print a document having text lines comprising a plurality of characters; a scanning device configured to scan the printed document and to generate a scanned image; and a processor configured to: detect positions in a process direction of the printing system of one of text lines and characters in the scanned image; determine position errors in the process direction in the printed document based on the detected positions in the scanned image; determine at least one motion quality defect of the printing system in the process direction based on the determined position errors; and initiate an activity associated with the printing system in response to a motion quality error having been determined.

In one embodiment, a method for detecting motion quality error of printed documents in a printing system comprises: printing a document having text; scanning the printed document to generate at least one scanned image; detecting positions in a process direction of the printing system of text characters in the at least one scanned image; determining character spacing errors in the process direction in the printed document based on the detected positions of text characters and the positions of the text characters in the original digital image; determining at least one motion quality defect of the printing system in the process direction based on the determined character spacing errors in the printed document; and initiating an activity associated with said digital imaging system in response to the motion quality errors having been identified.

In one embodiment, a system for detecting motion quality error of printed documents comprises: a print engine configured to print a document having text; a scanning device configured to scan the printed document and to generate a scanned image; and a processor configured to: detect positions in a process direction of the printing system of text characters in the at least one scanned image; determine character spacing errors in the process direction in the printed document based on the detected positions of text characters and the positions of the text characters in the original digital image; determine at least one motion quality defect of the printing system in the process direction based on the determined character spacing errors in the printed document; and initiate an activity associated with said digital imaging system in response to the motion quality errors having been identified.

These and other aspects of this disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not a limitation of the invention. In addition, it should be appreciated that structural features shown or described in any one embodiment herein can be used in other embodiments as well.

BRIEF DESCRIPTION OF THE DRAWINGS

FIG. 3 shows an exemplary printed text document.

FIGS. 5A and 5B show segmented text columns of the printed text document shown in FIG. 3.

DETAILED DESCRIPTION

According to an embodiment, a methodology for detecting motion quality error in printing system includes: printing a document having text lines, each text line comprising a plurality of characters; scanning the printed document to generate a scanned image; detecting positions in a process direction of the printing system of one of text lines and characters in the scanned image; determining position errors in the process direction in the printed document based on the detected positions in the scanned image; determining at least one motion quality defect of the printing system in the process direction based on the determined position errors; and initiating an activity associated with said printing system in response to a motion quality error having been determined.

As used herein, a "line" is a substantially contiguous row of pixels, such as, as a substantially contiguous row of letters, numbers, and/or other character indicia, in the case of text features. Lines of particular interest in printed documents may include those printed in the cross-process direction (i.e., orthogonal to the process direction) of the printing system. Text lines typically span the width of many printed document, in the case, of ordinary text documents. These features, however, need not span the entire width of the document. In fact, many documents may have multiple columns composed of lines.

"Line spacing," as used herein, is the spacing between two adjacent lines. As noted above, the line spacing is generally constant in documents. However, as discussed above, due to motion quality problems in the printing system, line spacing errors may be introduced. In other words, the spacing between adjacent lines, and/or characters, is not what it is supposed to be.

Experiments conducted by the inventors using induced motion quality errors show that the estimated frequencies and amplitudes using text documents are similar with respect to using ladder charts.

Figure 1:
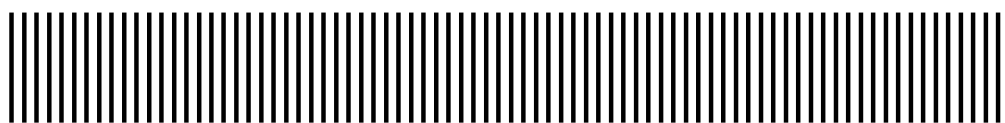
FIG. 1 illustrates an exemplary ladder chart that was used to measure photoreceptor drum velocity errors.

FIG. 1 illustrates an exemplary section of a 2-on-4-off ladder chart 100 that was used to measure the photoreceptor (PR) drum velocity errors. A 2-on-4-off ladder chart includes a series of lines with a width of 2 pixels (2-on) and a spacing of 4-pixel (4-off) among them. The ladder charts were printed in the process direction (with their individual lines running parallel along the cross-process direction). Measurements can be made by scanning the prints using an inline full-width array sensor or an offline scanner.

Figure 2:
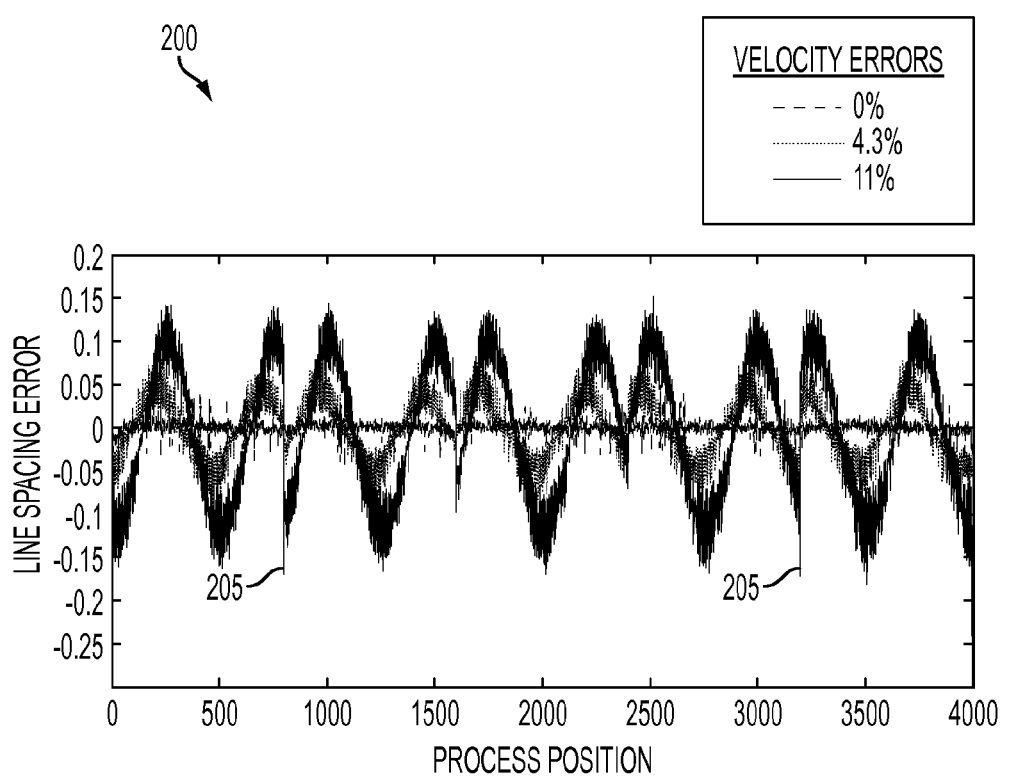
FIG. 2 is a plot showing the measured line spacings of the ladder-chart shown in FIG. 1 with induced velocity errors from five consecutive prints, respectively.

The printing system was configured to induce once-around Photoreceptor (PR) drum velocity errors to the magenta PR drum at varying levels to simulate motion quality errors. These levels included: 0%, 4.3%, and 11% speed variations in comparison with the nominal speed of the PR drum (dV/V %). FIG. 2 is a plot 200 showing the measured line spacings of the 2-on-4-off ladder-chart shown in FIG. 1 having the 0%, 4.3% and 11% speed variations from five consecutive prints, respectively.

The discontinuities regions 205 shown in the plot 200 were caused by inter-document zones (IDZ) formed on the margins of the ladder-chart on each page and the page-to-page gap. The PR drum velocity error of the printing system is shown as the periodic cycles of the line spacing errors measured from the ladder-chart.

Even though conventional ladder-charts can provide an accurate estimate of the motion quality (MQ), testing shows that documents having text and/or line content can also be used for continuous monitoring of the MQ performance without interrupting regular jobs. This is because text lines in documents typically consist of lines printed at uniform or near-uniform intervals similar to lines in a ladder-chart.

Accordingly, text features may be used to determine motion quality errors in printing systems. Their use does not require "skipping pitches" on photoreceptor surfaces or intermediate transfer elements, as required for conventional printing test patches. And, by using actual printed documents for motion quality error detection and analysis, conventional test patterns may no longer need to be printed or only sparsely printed to verify an alert. This avoids print job interruptions and/or wasting resources (such as toner/ink and paper). Additionally, IQ defect detection using printed documents not only allows users to examine the IQ in terms of their own images, but also enables continuous monitoring of the printing system's performance without interrupting the regular jobs. Thus, the printing system may monitor motion quality while maintaining high productivity.

It may be preferred to have text lines or even lines in ladder chart oriented orthogonal to the process direction (i.e., the cross-process direction) for detecting motion quality error. However, when text lines are oriented in the process direction, character spacing errors, character width spacing errors, or both, may be used to detect position errors in the process direction. "Character spacing," as used herein, refers to the distance from one character to the next (e.g., the distance from the middle of "e" to the middle of "x" in "example"). And, "character width spacing," as used herein refers to the width of each single character (e.g., the width of letter "e"). The accuracy, though, using the latter approach may not be as good as the former approach, in some instances, and may be more computational intensive.

Once text regions in the document have been identified, the orientation of the text may be determined with respect to the process direction X, and adjusted for small misalignments due to skewing or rotation of the scanned documents during scanning. Text orientation may be determined, and adjusted, using a conventional skew correction method, for example, as described in U.S. Pat. No. 5,187,753, herein incorporated by reference in its entirety.

When texts are composed with single colorant (e.g. K-only texts, M-only texts, etc.), the process continues. For texts composed of mixed colorants (e.g. red-text with both M and Y), additional process may be applied to decompose the scanned image into multiple single-colorant images. The decomposed scans with text (e.g. M & Y but not C or K for red-text) are then processed the same way that a single-colorant text is processed. One exemplary method to decompose the scan with mixed-color text is to apply an inverse printer model, which converts printed colors (e.g., in L*a*b* space) to their corresponding individual colorants, for separate consideration. Inverse printer models are readily available from the International Color Consortium (ICC) profile provided in the color management system of many printers. Other known methods can also be used to derive an inverse printer model.

For documents containing a combination of pictorial and text regions, the images may be segmented using a conventional segmentation technique such as, for example, connected-components analysis to identity the pictorial or colored regions. Based on the size of the regions, the pictorial or colored regions may be removed from the scanned image. In some instances, the removed pictorial or colored regions may be used for subsequent image analysis (if desired) for printer non-uniformity detection, such as described in co-pending application Ser. No. 12/552,519, herein incorporated by reference in its entirety.

FIG. 3 shows a typical printed text document 300. The document 300 may have one or more columns 310, 320 of text (two shown), with text lines running orthogonal to the process direction X. As shown, most of text lines 305 of the document 300 are spaced at regular intervals in the process direction X while only a few lines may have different spacings, such as, for instance, the equations 307a, 307b in the text.

Line spacing errors can be estimated using preceding lines in the scanned image. For example, the magnitude of the motion quality error may be estimated from maximum and minimum values of a determined line. And, the relative positions between the maximum and minimum values may then be used to determine or estimate the frequency and amplitude of the line spacing.

FIGS. 5A and 5B show segmented text columns 510, 520 corresponding to columns 310, 320, respectively, of the printed text document 300.

In addition, in some cases, lines 305 from any two columns 310, 320 may not necessarily be aligned with each other. This can be problematic when evaluating line centers/edges. Thus, in some implementations, the document can be segmented into multiple columns of text (or line art) from each other to generate one or more columns.

Figure 4A:
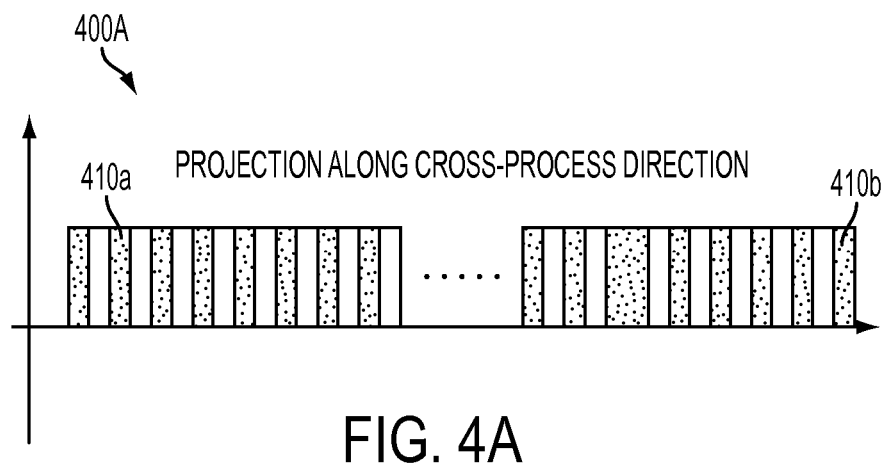
FIGS. 4A and 4B show projected text lines of a printed text document in the cross-process direction and the process direction, respectively.
Figure 4B:
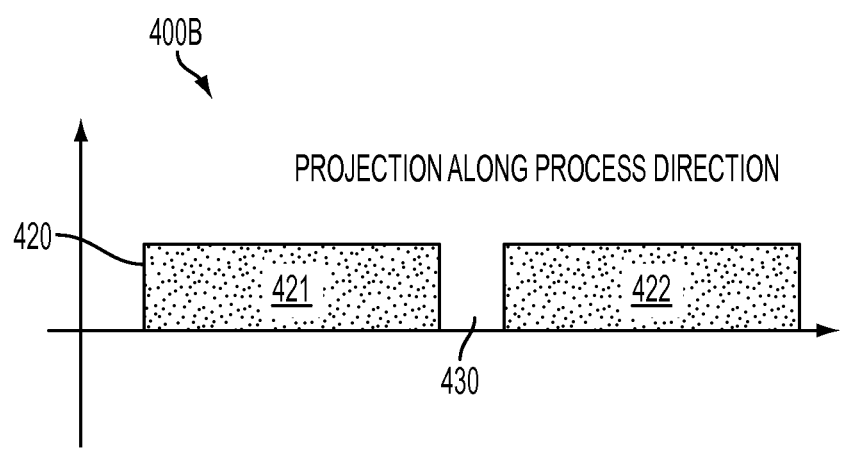

FIGS. 4A and 4B show electronically "projecting" the scanned text in the process direction 400A and cross-process directions 400B, respectively, in accordance with an embodiment.

In FIG. 4A, the gray regions, e.g., 410a and 410b correspond to projected text lines in the cross-process direction.

In one implementation, a determination is initially made to verify that the projected text is in the process direction X (e.g., as shown in FIG. 4B). If not, the particular scanned image may be "skipped" for motion quality detection.

As shown in FIG. 4B, the gap 430 between gray regions 420 may be recognized as the gap between two adjacent text columns 421, 422. Next, each text column 421, 422 may then be projected separately in the cross-process direction as shown in FIG. 4A. From there, line centers can be detected and line spacing and line spacing errors can be calculated.

For each of the segmented text columns 510, 520 of the scanned image, a profile may be obtained and the line edges (centers) identified. In one implementation, a one-dimensional (1-D) profile may be generated. A 1D profile is a projection of the document in either the process or the cross-process direction. It can be generated by using an inline full-width array sensor or offline scanner to produce a 2-D image.

Figure 6:
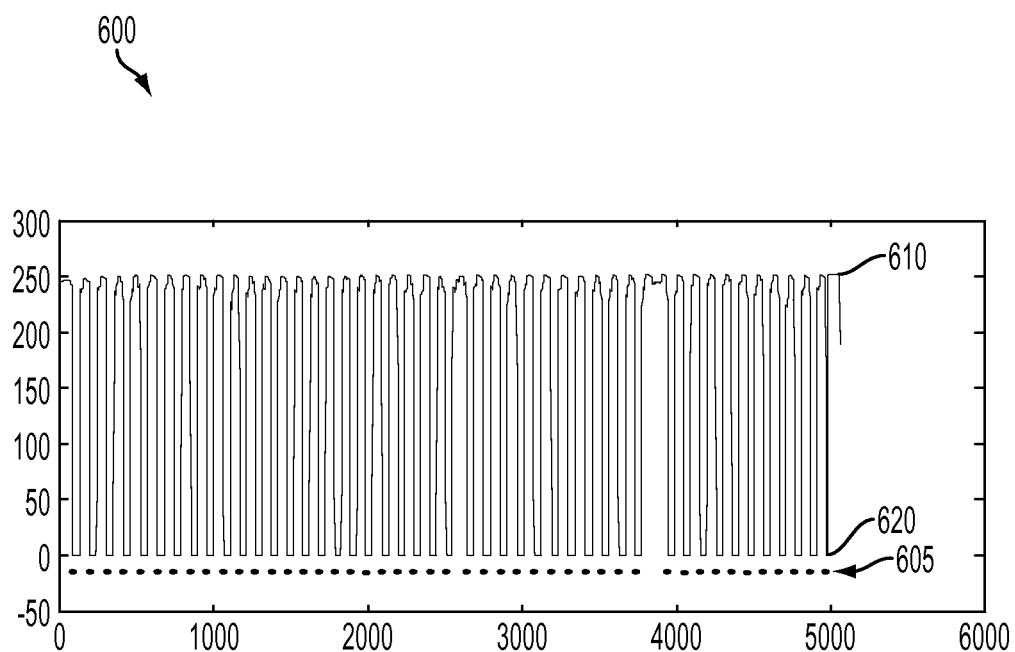
FIG. 6 is a plot showing a profile of the text column shown in FIG. 5B.

FIG. 6 is a plot 600 showing a profile of the text column shown in FIG. 5B. In this plot, the black dots 605 in the lower portion of the plot denote the detected line edge on one side of the text lines. The profile of the text column in the scanned document appear as vertical bar running from a low intensity, which represents the average darkness of those lines of texts, (e.g., about zero graylevel) to a high intensity, which represents the white spaces (paper) between lines (e.g., about 250 graylevel in this case). Each segment in the profile, whose intensity goes from near maximum 610 to near minimum 620 and then back to near maximum 610, represents the projection of one line of texts in 510. Hence, the position of each line can be detected as the left edge (top of the line of texts), right edge (bottom of the line of texts), or the centroid (center of the line of texts) etc. of the profile in each segment. From the detected line positions, there may be several ways to evaluate the motion quality.

Figure 7A:
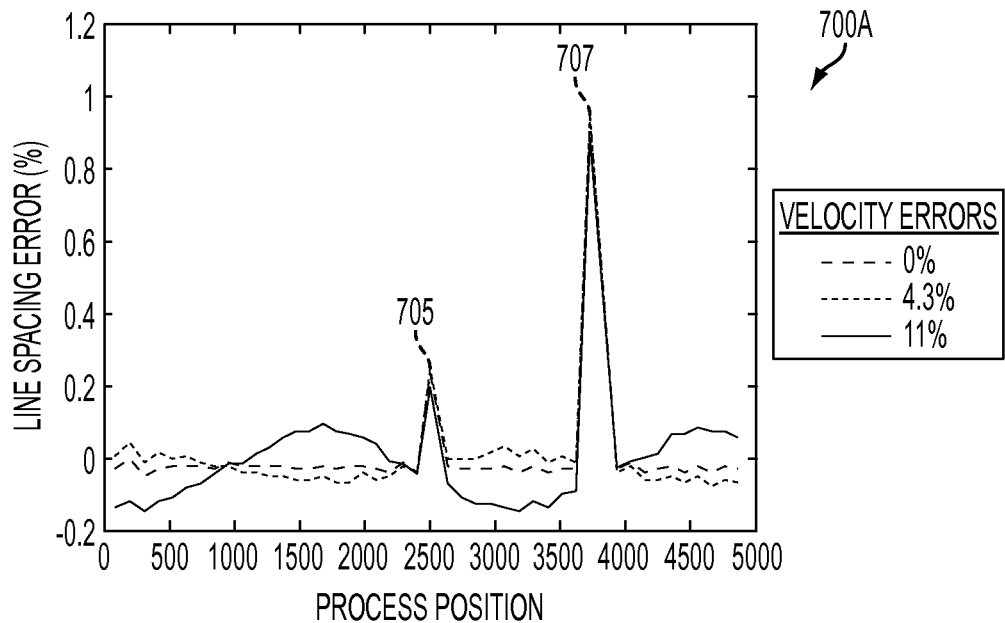
FIGS. 7A and 7B are plots showing determined line spacing errors of the text column shown in FIG. 5B.
Figure 7B:
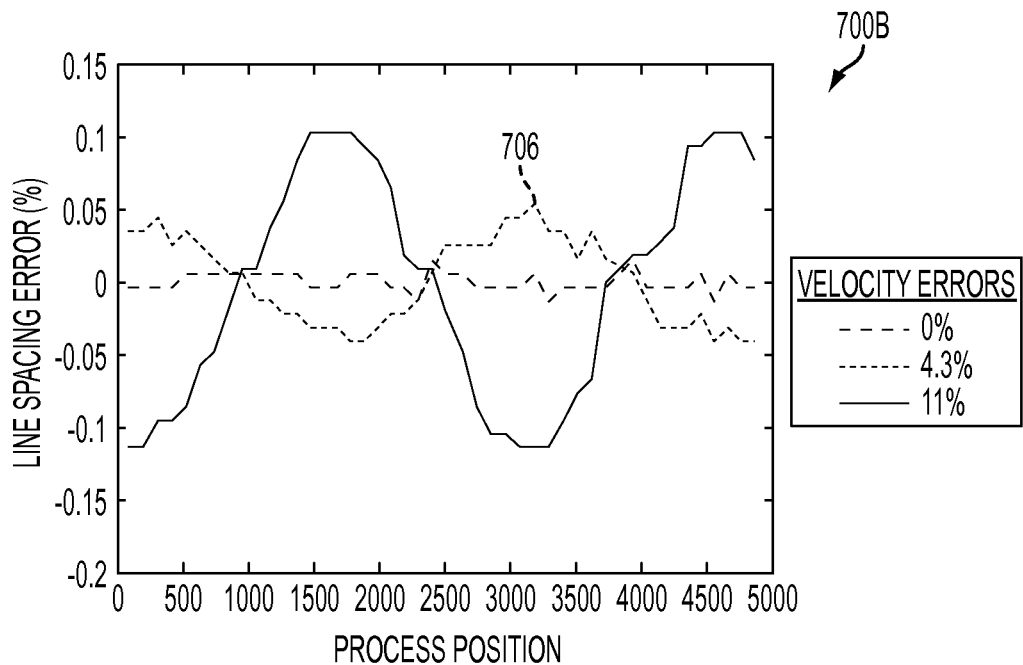

FIGS. 7A and 7B are plots 700A, 700B showing determined line spacing errors (i.e., the differences between neighboring lines to the average line spacing of all these neighboring line spacings) in accordance with one embodiment. In order to account for various sized text and line spacing, the results shown in plots 700A, 700B have been normalized with respect to the nominal line spacing in the text document.

In FIG. 7A, the plot 700A shows the once-around PR drum velocity error and line spacing errors for three scenarios, which correspond to 0%, 4.3% and 11% induced velocity errors, respectively.

There is a substantial amount of outliers (e.g., spikes 705, 707) in the plot 700A which may prove error-prone for analysis due to occasional abnormal line spacing, for example from mathematical equations. Thus, the data may be run through a low-pass filter or non-linear filter (such as, for example, a median filter) to smooth out and remove outliers or any image content induced variations from the functions. FIG. 7B is a plot 700B showing the line spacing errors after processing the data through the median filter configured to remove outliers and the image content induced variations to the line spacing. This process results in relatively smooth functions compared to the plot 700A shown in FIG. 7A. The performance can be further improved if the original intended image contents (e.g. low-resolution digital representation) are known/accessible to this analysis.

The positions of the two spikes 705, 707 in the plots correspond to the two wider spacings in the text document (i.e. white space before the text on the right 512 and the equation 515 in the text shown near the middle of the text) shown in FIG. 5B.

Figure 8:
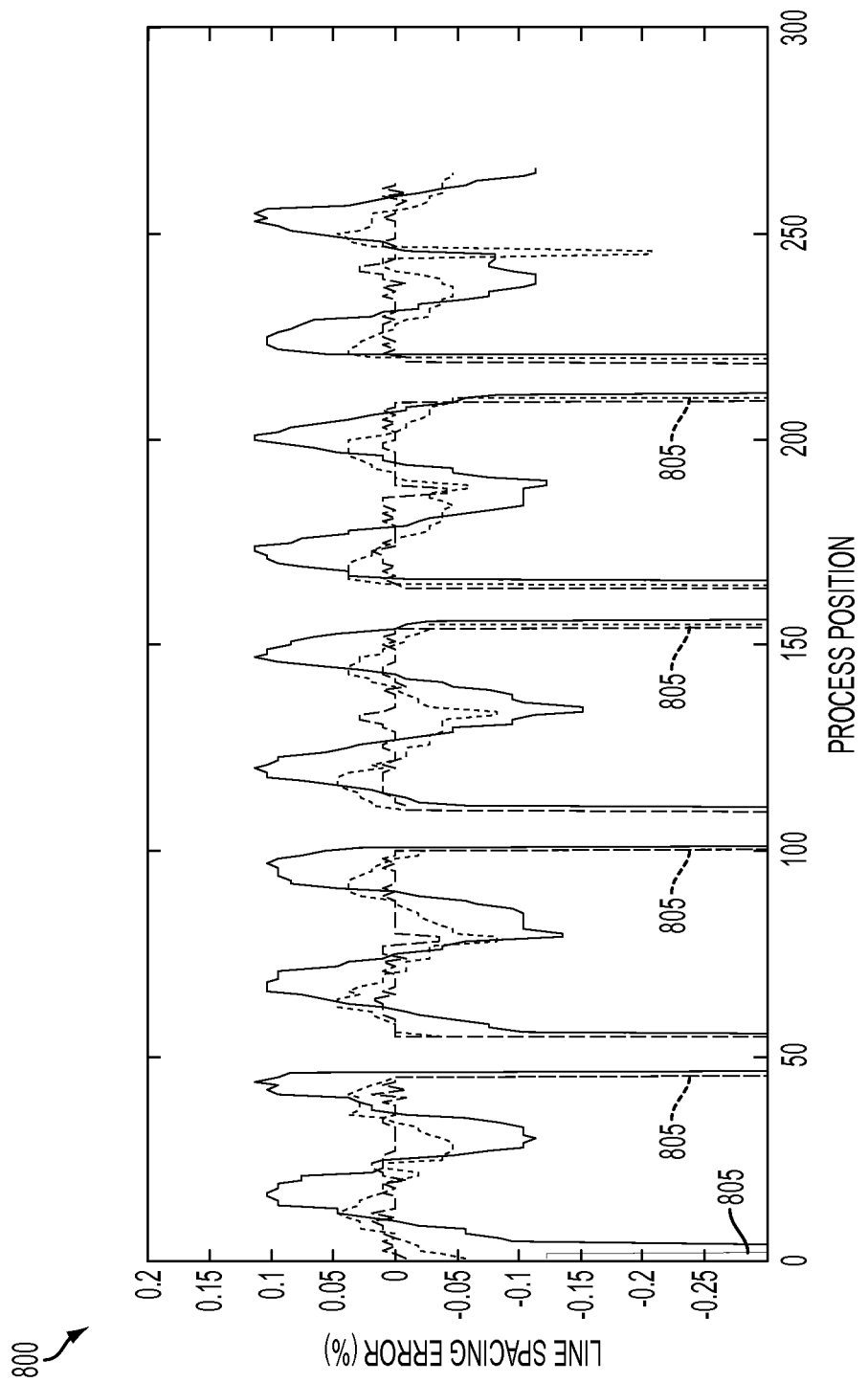
FIG. 8 is a plot showing the results from a sequence of five printed text documents.

FIG. 8 is a plot 800 showing the results of scanning and averaging a sequence of five text documents. The "zero" regions 805 shown in the plot 800 indicate gaps between pages.

Comparing the amplitudes of line spacing errors shown in FIGS. 2 and 7, it will be appreciated that the normalized line spacing error measured using the text document is very close to what was measured using the ladder-charts.

In the previously described embodiments, line spacing error was determined without consideration of the original digital image. However, in cases where the original digital images are available in the image path (e.g. low-resolution digital representation should be sufficient), they can be used to improve the accuracy of the analysis. For example, the use of the original digital image may provide lower noise estimates, provide intended line spacings (rather than assuming them to be mostly constant previously), and be used to extract image magnification and determine other image geometry errors.

Figure 9:
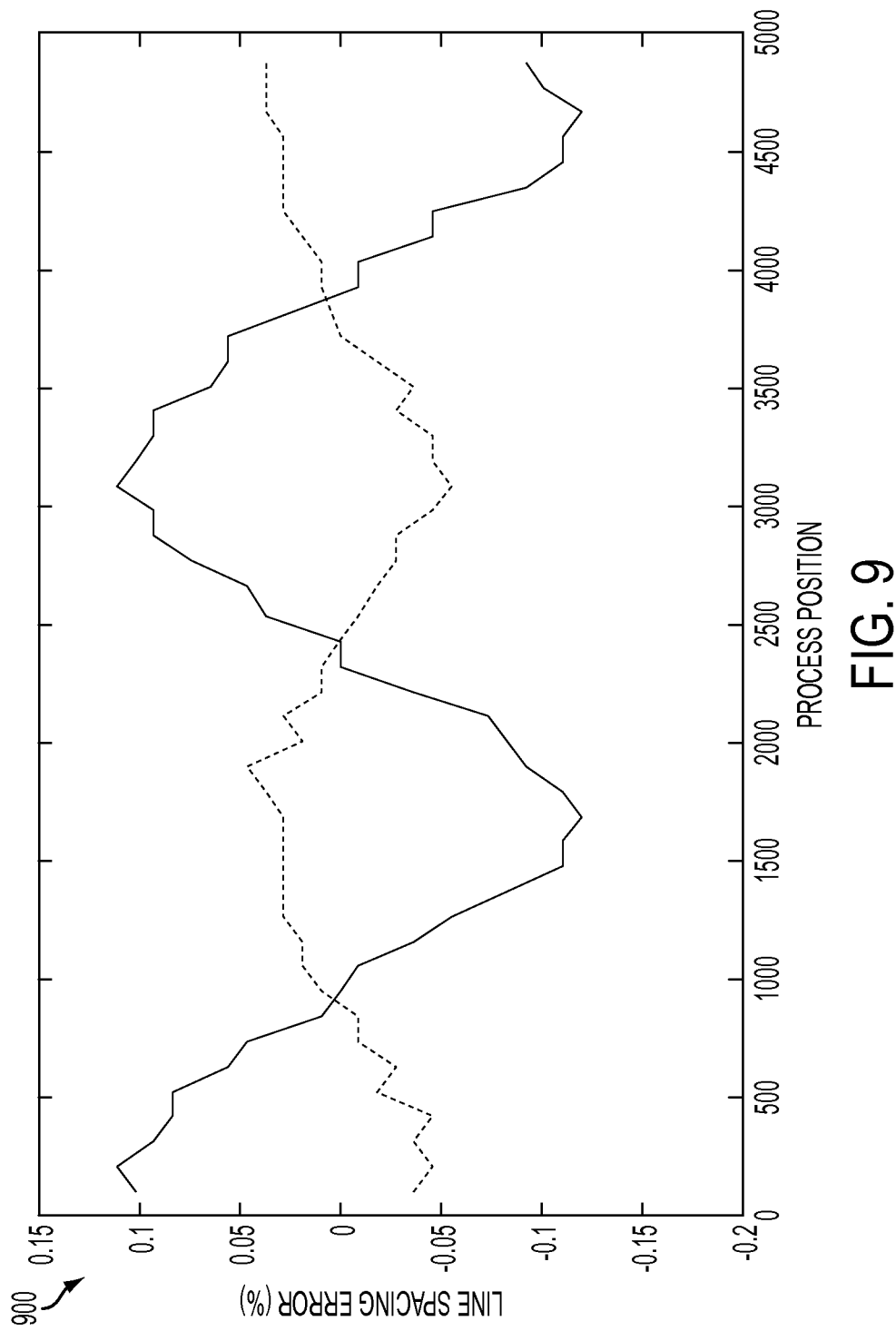
FIG. 9 is a plot showing the line spacing of the digital original image of the text column shown in FIG. 5B.

FIG. 9 is a plot 900 showing the line spacing of the original digital images that were used for generating the plots shown in FIG. 7A. Comparing FIGS. 7A and 9, it can be appreciated that the original digital image does not have the high-frequency data, and therefore it does not require additional filtering to remove.

Having the original digital image may provide other advantageous results. For example, the scanned image may be initially registered with a first non-background scanline of the original digital image to provide a reference origin. This may provide greater accuracy.

In addition, having the original digital content can significantly reduce the dependence on scanned image content alone. Since content is present in the original digital document, the scanned image may be relied upon primarily for determining deviations in line spacings. This may be the case, for instance, when the number of text lines within a page is limited, such as, for example, typical Microsoft PowerPoint® slides.

By detecting text line spacing errors, it may be possible to detect other types of spatial errors, such as, for example, magnification errors using customer documents. Magnification error can be a result of paper shrinkage during printing. This error can happen in both process and cross-process directions. As a result, the line spacing between text lines can become smaller and character width/distance can become narrower than expected. Hence, text lines oriented in both directions may be considered.

Once the line spacing error has been calculated, the next step is to determine (or estimate) the frequency and amplitude of the motion quality error. This may be performed by determining the positions of turning points (e.g., maximum peaks and minimum valleys) of the estimated line spacing error function that correspond to the period and amplitude of the defect. The frequency can be determined simply by taking the inverse of the period. This approach may be effective when the once-around drum frequency is not significantly low (i.e. less than a half cycle within a page). Table 1, below, shows the estimated frequencies and amplitudes from scanning and averaging five consecutive printed documents compared to results using ladder charts, where the motion quality error is at 1%, 4.3% and 11% dV/V at approximately 0.008 cyc/mm.

TABLE 1

Estimated once-around motion quality error and frequency

| | Frequency (cyc/mm) 0.008 | | Peak Value dV/V 0.04/0.11 | | Valley Value dV/V −0.04/−0.11 | |
|---|---|---|---|---|---|---|
| Input | Ladder | Text | Ladder | Text | Ladder | Text |
| 1% dV/V | 0.0081 ± 0.001 | 0.0083 ± 0.002 | 0.008 ± 0.001 | 0.01 ± 0.002 | −0.007 ± 0.001 | −0.008 ± 0.001 |
| 4.3% dV/V | 0.0077 ± 0.001 | 0.011 ± 0.002 | 0.04 ± 0.01 | 0.04 ± 0.01 | −0.0034 ± 0.004 | −0.04 ± 0.006 |
| 11% dV/V | 0.0078 ± 0.001 | 0.011 ± 0.003 | 0.1 ± 0.01 | 0.108 ± 0.02 | −0.1 ± 0.01 | −0.102 ± 0.02 |

These results demonstrate that the use of text document to detect motion quality errors can be nearly as accurate as using conventional ladder-charts. In fact, the use of text document may be able to detect motion quality errors well below 1% dV/V.

Another way to estimate the frequency and amplitude of the once around motion quality error may be to estimate the frequency and amplitude based on a functional-fit over several pages as described, for instance, in co-pending U.S. patent application Ser. No. 12/555,308, herein incorporated by reference in its entirety. This approach may be useful when the frequency of the motion quality error is low, i.e. less than a half cycle within the page. In some cases, to more accurately estimate the frequency, it may be necessary to consider several consecutive pages together.

Figure 10:
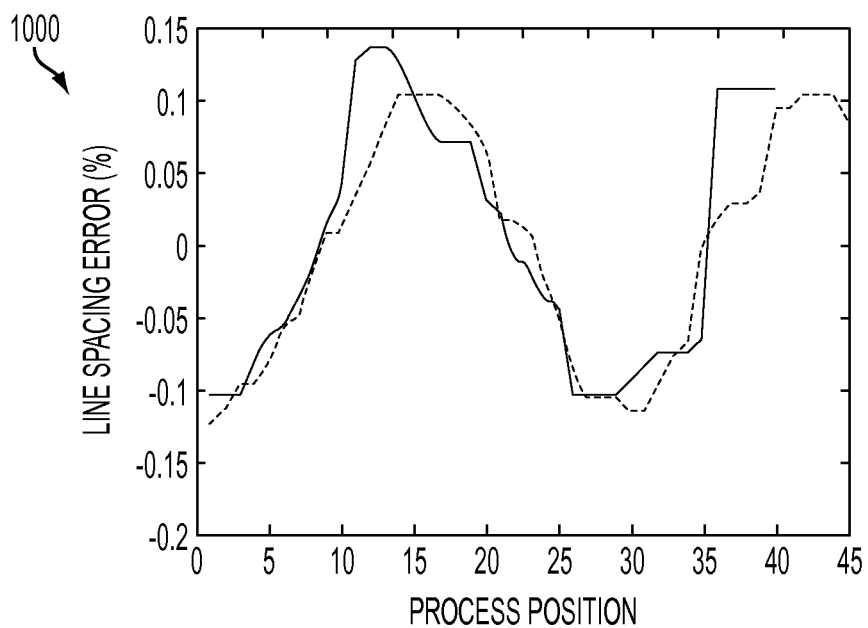
FIG. 10 is a plot which may be used for estimating line-spacing errors from FIGS. 5A and 5B.

FIG. 10 shows a plot 1000 which may be used for estimating line-spacing errors using the columns 510, 520 shown in FIGS. 5A and 5B, respectively. In some instances, the estimated line spacings or the estimated frequency and/or amplitude may be averaged depending on a particular application. For example, if the digital original images are available, the averaging of line spacing may work as well as averaging the estimated frequency and amplitude. Averaging the determined frequency and amplitude of multiple pages and/or documents may avoid some errors due to image content.

In the experiments conducted by the inventors, single color text was used. However, for multiple color separations, motion quality error can potentially cause color-to-color registration errors. These may appear, for instance, as color fringes around text/line edges. The edges may also become blurred which can make it more challenging to detect line edge (centers). However, text documents rarely contain text of lines of two or more colors. And, even when they do, as the drum velocity varies within the page overlay colors become separated which can still be useful to detect the color-to-color registration error as well the motion quality errors. Single colorant images can be obtained by applying inverse printer model.

Figure 11:
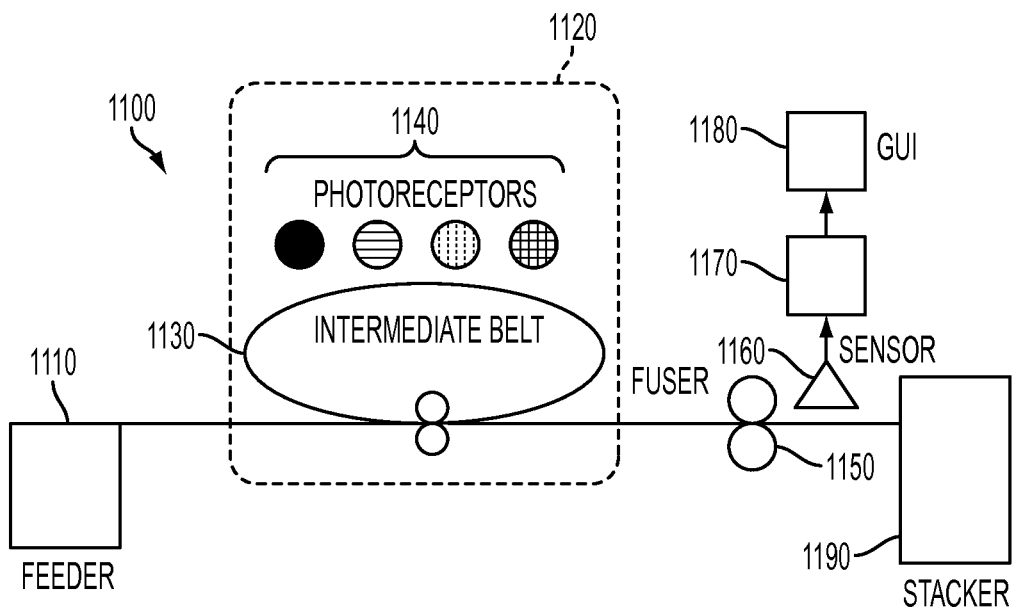
FIG. 11 depicts an exemplary printing system in accordance with an embodiment.

FIG. 11 depicts an exemplary printing system 1100 in accordance with an embodiment.

The printing system 1100 may accept digital content for images in any one of a number of possible formats, such as, for example, TIFF, JPEG, or Adobe® PostScript®. This image content is then "interpreted" or "decomposed" in a known manner into a format usable by the marking engine controller. The input image data may be represented in terms of the constituent process colors according to the color space model (e.g., CYMK, RGB, L*a*b*, etc.). Device dependent color space values, such as RGB and CYMK input image data, may be converted to a device-independent color space, such as CIE-LAB color space, using transformation algorithms or a look-up-table (LUT), as known in the art, for example, using ICC color management profiles associated with the printing system.

A media feeder 1110 supplies one or more types of printable substrate media to a print (or marking engine) 1120 for transferring toner to the substrate media. From the print engine 1120, the printed media travels to the fuser 1150 where the toner is heated and fused to the media and then is transported to a stacker 1190.

As illustrated, the print engine 1120 may be a multi-color engine having a plurality of imaging/development subsystems that are suitable for producing individual one or more colors to produce the printed image. The print engine 1120 may mark xerographically on an intermediate transfer belt 1130. For instance, the print engine 1120 may include one or more photoreceptors 1140 which render toner images of input image data on the belt 1130, which in turn transfers the images to the substrate media. As shown, cyan, magenta, yellow and black (CMYK) photoreceptor drums 1140 are provided, which image an intermediate belt 1130. Of course, other photoreceptors may be provided.

As will be appreciated, the printing system may be configured having a single marking engine, or as a tightly integrated parallel printing (TIPP) system or clustered printing system having multiple marking engines.

Along the media path, after the fuser 1150 and before the stacker 1190, a sensor 1160 may be positioned that is configured to scan the printed image. The sensor 1160 may include one or more of the following: a digital scanner, full width array (FWA) sensor; or two-dimensional array sensor, such as charge-coupled device (CCD) or complimentary metal-oxide semiconductor (CMOS) scanning technology, or the like. For instance, a FWA sensor assembly may be mounted in the post fuser location for image quality measurement purposes. Of course, it should be appreciated that offline measurements may be made alternatively or additionally.

A controller 1170 may be configured to perform the calculations based on the scanned image as described above, and a graphical user interface (GUI) 1180 may be configured to display the results of the motion quality error detection. In some implementations, the controller 1170 may be dedicated hardware like ASICs or FPGAs, software (firmware), or a combination of dedicated hardware and software. For the different applications of the embodiments disclosed herein, the programming and/or configuration may vary. In one embodiment, the controller 1170 may be a digital front end (DFE) connected to the printing system 1100.

GUI 1180 may be provided to enable the user to control various aspects of the printing system 1100. In some implementations, GUI 1180 may include a display device, such as, for example, a cathode ray tube (CRT), liquid crystal display (LCD), plasma, or other display device for depicting visual information. GUI 1180 may also include a speaker for generating sound or audio information. Alerts may be broadcast via GUI 1180 also. The stacker device 1190, as known in the art, may be configured for collecting, collating, sorting and/or storing printed documents.

Figure 12:
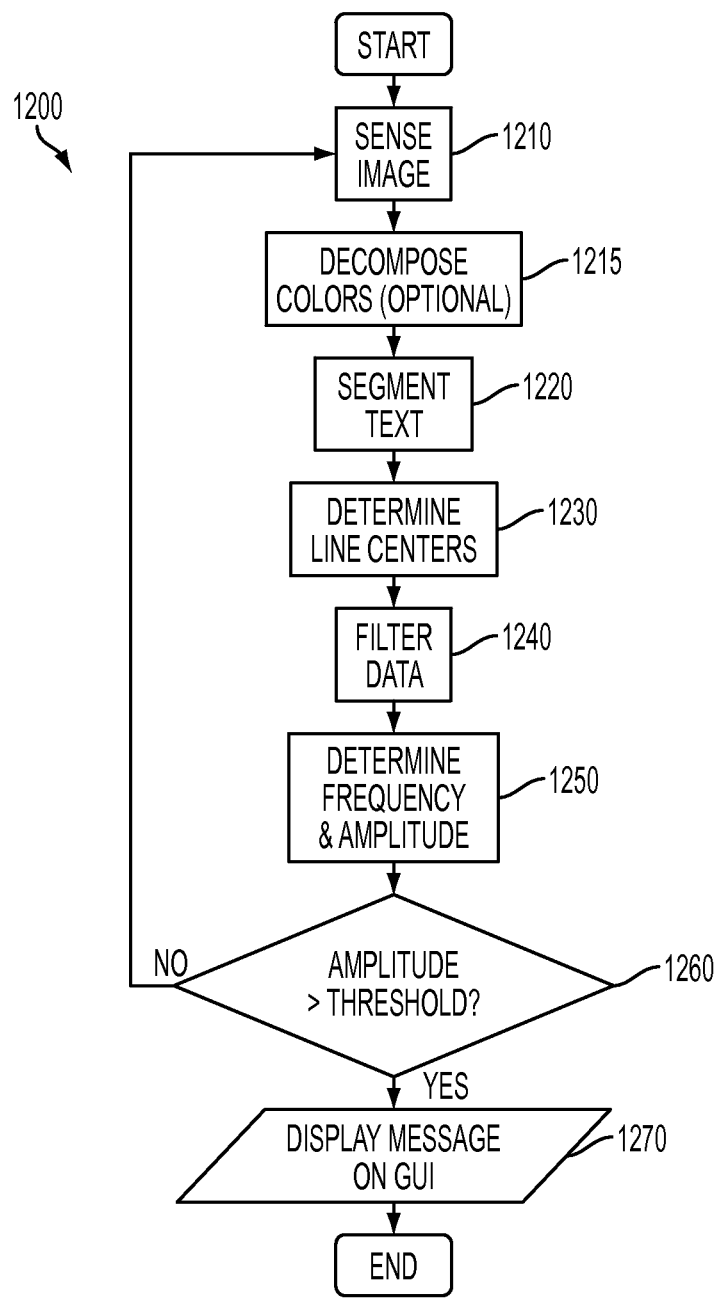
FIG. 12 depicts an exemplary method for performing motion quality error detection in a printing system in accordance with an embodiment.

FIG. 12 depicts an exemplary method 1200 for performing motion quality error detection in a print system in accordance with an embodiment.

In step 1210, an image is printed and subsequently sensed.

The printed document may have text with single colorant, text with mixed colorants, and/or white (or other colored) text on an uniform color background (i.e., negative text). Scanning may include "reading" the printed document with a sensor positioned downstream of the print engine. In some instances, step 1215 may be optionally performed in which the scanned image may be decomposed into multiple single-colorant images with text when the printed document has mixed-colorant texts via, for example, the use of inverse printer model. Next, in step 1220 the scanned image is segmented, if there is more than one column of text or mixed image content of pictorials and text.

Continuing to step 1230, the center lines of one or more of the segmented columns are determined. In addition, the image data may be filtered to remove noise in step 1240. For example, a low-pass or non-linear filter (e.g., median filter) may be used. This may remove image content induced line spacing variations. The median filter is configured to reduce the variation due to image content variations. For example, the line of the equation produces larger gaps than the regular text lines in FIG. 7A. Before an estimate the true spacing errors may be determined, such image context variations can be removed via the median filter. For instance, in a 600 dpi scan, 5 pixels may be used for the filter.

In step 1250, the frequency and amplitude are determined for the text lines. Next in step 1260, a determination is made whether the amplitude is greater than a predetermined value (or threshold). For example, the threshold for amplitude may be about 1% dV/V for the amplitude. If this is not the case, the process continues to step 1210 and the repeats. Otherwise, if the motion quality error deviates from the threshold value, the process continues to step 1270, in which an alert or warning may be generated to alert an operator. Alerts and/or warnings generated by the GUI 1280 may be audio, visual, or both. An operator can then take remedial action to correct the determined defect. This may include performing maintenance and/or other servicing (e.g., part replacement). Alternatively, the system can trigger the printing and measuring of ladder-chart test targets to more accurately characterize the MQ defect.

It will be appreciated that the methodology described herein is not limited to xerographic printers, but could be applied to any printing system which prints images that consist at least partly of text and can have motion quality errors.

In the experimentation described above, a motion quality defect at the photoreceptor once around frequency was used as the disturbance. However, it will be appreciated that the methods and systems described herein may be configured to detect a wide range of disturbance frequencies that could arise from one or more harmonics of the photoreceptor once around, or from other components that might cause motion quality variation, such as, for example, bias charge roll once around or bias transfer roll once around. The range of detection frequencies may depend on the length of the page and the customer image content. Higher frequency customer image content that includes more tightly spaced text lines, for instance, may enable higher frequencies to be measured because more samples per unit distance are available.

While this disclosure has been described in connection with what is presently considered to be the most practical and preferred embodiments, it is to be understood that it is capable of further modifications and is not to be limited to the disclosed embodiments, and this disclosure is intended to cover any variations, uses, equivalent arrangements or adaptations of the inventive concepts following, in general, the principles of the disclosed embodiments and including such departures from the present disclosure as come within known or customary practice in the art to which the embodiments pertains, and as may be applied to the essential features hereinbefore set forth and followed in the spirit and scope of the appended claims.

What is claimed is:

1. A method for detecting motion quality error of printed documents in a printing system comprising:
   printing a document having text lines, each text line comprising a plurality of characters;
   scanning the printed document to generate a scanned image, the scanned image having the text lines and the characters;
   determining the orientation of the text lines in the scanned image with respect to a process direction of the printing system;
   detecting positions in the process direction of the printing system of one of the text lines and the characters in the scanned image;
   determining position errors in the process direction in the printed document based on the detected process direction positions of one of the text lines and the characters in the scanned image and the determined orientation of the text lines;
   determining at least one motion quality error of the printing system in the process direction based on the determined process direction position errors; and
   initiating an activity associated with said printing system in response to a motion quality error having been determined.

2. The method according to claim 1, wherein determining position errors in the process direction comprises:
  (i) determining line spacing errors when the text lines are oriented in the cross-process direction, or
  (ii) determining character spacing errors, character width spacing errors, or both, when the text lines are oriented in the process direction, based on the detected positions of at least one of the text lines and the characters.

3. The method according to claim 1, further comprising: segmenting the scanned image to identify and separate features of text from the scanned image.

4. The method according to claim 1, further comprising: segmenting the scanned image into individual text columns, if there are multiple text columns in the printed document.

5. The method according to claim 1, wherein scanning the printed document to generate a scanned image further comprises: decomposing the scanned image into multiple scanned images corresponding to each colorant using an inverse printer model; and maintaining only the scanned images having text for further analysis.

6. The method according to claim 1, wherein the document having text comprises one or more of: text with single colorant, text with mixed colorants, or text on a uniform color background.

7. The method according to claim 1, wherein determining position errors comprises: determining maximum and minimum values of line or character spacing based on the detected positions.

8. The method according to claim 7, further comprising: determining the amplitude of the line or character spacing errors by taking the difference between the maximum and minimum values.

9. The method according to claim 7, further comprising: determining the frequency of the line or character spacing errors by taking the inverse of the distance between adjacent maximum or minimum positions.

10. The method according to claim 1, wherein, if an original digital image corresponding to the printed document is available, registering the scanned image with a first non-background scanline of the original digital image.

11. The method according to claim 1, further comprising: filtering out position variations due to image-content.

12. The method according to claim 1, further comprising: identifying centers, edges, or both of the text lines in the scanned image.

13. The method according to claim 1, wherein the position errors are estimated using preceding text lines in the scanned image.

14. The method according to claim 1, wherein the position errors are estimated using positions in the original digital image.

15. The method according to claim 1, further comprising: generating an alert, if the determined motion quality error deviates from a predetermined value.

16. A printing system for detecting motion quality error of printed documents comprising:
  a print engine configured to print a document having text lines comprising a plurality of characters;
  a scanning device configured to scan the printed document and to generate a scanned image having the text lines and the characters; and
  a processor configured to:
    determine the orientation of the text lines in the scanned image with respect to a process direction of the printing system;
    detect positions in the process direction of the printing system of one of the text lines and the characters in the scanned image;
    determine position errors in the process direction in the printed document based on the detected process direction positions of one of the text lines and the characters in the scanned image and the determined orientation of the text lines;
    determine at least one motion quality error of the printing system in the process direction based on the determined process direction position errors; and
    initiate an activity associated with the printing system in response to a motion quality error having been determined.

17. The system according to claim 16, wherein, to determine position errors in the process direction, the processor is configured to:
  (i) determine line spacing errors when the text lines are oriented in the cross-process direction, or
  (ii) determine character spacing errors, character width spacing errors, or both, when the text lines are oriented in the process direction, based on the detected positions of at least one of the text lines and the characters.

18. The system according to claim 16, wherein the processor is configured to segment the scanned image to identify and separate features of text from the scanned image.

19. The system according to claim 16, wherein the processor is configured to segment the scanned image into individual text columns, if there are multiple text columns in the printed document.

20. The system according to claim 16, wherein in scanning the printed document to generate the scanned image, the processor is configured to: decompose the scanned image into multiple scanned images corresponding to each colorant using an inverse printer model and; maintain only the scanned images having text for further analyses.

21. The system according to claim 16, wherein the document having text comprises one or more of: text with single colorant, text with mixed colorants, or text on an uniform color background.

22. The system according to claim 16, wherein, in determining position errors, the processor is configured to: determine maximum and minimum values of line or character spacing based on the detected positions.

23. The system according to claim 22, wherein the processor is configured to: determine the amplitude of the line or character spacing errors by taking the difference between the maximum and minimum values.

24. The system according to claim 22, wherein the processor is configured to determine the frequency of the line or character spacing errors by taking the inverse of the distance between adjacent maximum or minimum positions.

25. The system according to claim 16, wherein, if an original digital image corresponding to the printed document is available, the processor is configured to register the scanned image with a first non-background scanline of the original digital image.

26. The system according to claim 16, wherein the processor is configured to filter out position variations due to image-content.

27. The system according to claim 16, wherein the processor is configured to identify centers, edges, or both of the text lines in the scanned image.

28. The system according to claim 16, wherein the processor is configured to estimate the position errors using preceding text lines in the scanned image.

29. The system according to claim 16, wherein the processor is configured to estimate the position errors using positions in the original digital image.

30. The system according to claim 16, wherein the processor is configured to: generate an alert, if the determined motion quality error deviates from a predetermined value.

31. A method for detecting motion quality error of printed documents in a printing system comprising:
   printing a document having text lines, each text line comprising a plurality of text characters;
   scanning the printed document to generate a scanned image, the scanned image having the text lines and the text characters;
   determining the orientation of the text lines in the scanned image with respect to a process direction of the printing system;
   detecting positions in the process direction of the printing system of the text characters in the scanned image;
   determining character spacing errors in the process direction in the printed document when the text lines are oriented in the process direction, wherein the character spacing errors are determined based on the detected process direction positions of the text characters and positions of the text characters in the original digital image;
   determining at least one motion quality error of the printing system in the process direction based on the determined process direction character spacing errors; and
   initiating an activity associated with the printing system in response to a motion quality error having been identified.

32. A printing system for detecting motion quality error of printed documents comprising:
   a print engine configured to print a document having text lines, each text line comprising a plurality of text characters;
   a scanning device configured to scan the printed document and to generate a scanned image having the text lines and the text characters; and
   a processor configured to:
      determine the orientation of the text lines in the scanned image with respect to a process direction of the printing system;
      detect positions in the process direction of the printing system of the text characters in the scanned image;
      determine character spacing errors in the process direction in the printed document when the text lines are oriented in the process direction, wherein the character spacing errors are determined based on the detected process direction positions of the text characters and positions of the text characters in the original digital image;
      determine at least one motion quality error of the printing system in the process direction based on the determined process direction character spacing errors; and
      initiate an activity associated with the printing system in response to a motion quality error having been identified.

\* \* \* \* \*